United States Patent [19]

Endfield et al.

[11] Patent Number: 4,727,478
[45] Date of Patent: Feb. 23, 1988

[54] COMPUTER APPARATUS AND REMOTE KEYBOARDS THEREFOR

[76] Inventors: Cyril Endfield, 39 Thurloe Square, London SW7; Christopher J. Rainey, 4 Broadgate, Pilton, Barstaple, North Devon; John Southgate, Dalegarth, Longland Lane, Georgeham, North Devon, all of England

[21] Appl. No.: 580,630

[22] Filed: Feb. 16, 1984

[30] Foreign Application Priority Data

Feb. 23, 1983 [GB] United Kingdom ............... 8305011

[51] Int. Cl.⁴ .................... G06F 3/023; G06F 3/14
[52] U.S. Cl. .................................................. 364/200
[58] Field of Search ............... 364/200 MS, 900 MS, 364/518, 521; 340/365 R, 365 F, 347 DA, 365 S, 706, 711

[56] References Cited

U.S. PATENT DOCUMENTS

| | | | |
|---|---|---|---|
| 4,015,254 | 3/1977 | Strandt | 340/365 S |
| 4,042,777 | 8/1977 | Bequaert et al. | 340/365 R |
| 4,064,560 | 12/1977 | Baxter | 364/900 |
| 4,067,431 | 1/1978 | Whitaker | 340/365 R |
| 4,360,892 | 11/1982 | Endfield | 364/900 |
| 4,443,789 | 4/1984 | Endfield et al. | 340/365 R |
| 4,516,939 | 5/1985 | Crimmins, Jr. | 434/114 |

FOREIGN PATENT DOCUMENTS

| | | |
|---|---|---|
| 0011420 | 2/1979 | European Pat. Off. |
| 2035646 | 3/1971 | Fed. Rep. of Germany |
| 2015220 | 9/1979 | United Kingdom |

OTHER PUBLICATIONS

Floyd, Thomas L., Digital Fundamentals, 1982, pp. 421–422.

Primary Examiner—Thomas M. Heckler
Assistant Examiner—Kevin A. Kriess
Attorney, Agent, or Firm—Hughes & Cassidy

[57] ABSTRACT

Computer apparatus comprising a central computer having a data input port, means connecting two or more remote chord keyboards to the input port, and means for identifying with each respective keyboard alphanumeric and like character data and command instructions generated by operation thereof and received through the input port; the central computer is programmed to process and combine the character data from the keyboards in accordance with the commands and to output resultant information for display in common by video and/or audio display means. In a preferred embodiment key-operated switches incorporated in each remote chord keyboard are connected in an R-2R resistive ladder network so that operation thereof either singly or in combinations of two to all will produce ratiometric changes in an analog output voltage that uniquely varies as the binary weighting of the operated switch or switch combination. An analog-to-digital converter is connected to the input port of the computer to translate the signals generated at the remote chord keyboard to a form that can be handled by the central processing unit of the central computer.

5 Claims, 5 Drawing Figures

COMPUTER APPARATUS AND REMOTE KEYBOARDS THEREFOR

This invention relates to computer apparatus and especially to computers combined with several remote keyboards; principal, but not sole, applications being for the teaching of computer usage or the playing of computer games.

It is an object of the present invention to provide computer apparatus that enables several operators to combine to use a central computer. This is in contradistinction to conventional time-sharing wherein a particular computer is used for two or more concurrent operations; the computer operates momentarily to fulfil one purpose, then another, returns to the first, and so on in succession until the operations are completed. This activity is performed at high speed according to a strict sequence, each independent operation being executed as a series of finite steps. Usually such time-sharing computer apparatus comprises a main frame, peripherals and a series of remote terminals sending data to and receiving data from the main frame.

According to the present invention, computer apparatus comprises a central computer having a data input port, means connected two or more remote chord keyboards to the input port, means for identifying with each respective keyboard alpha-numeric and like character data and command instructions generated by operation thereof and received through the input port; the central computer being programmed to process and combine the character data from the keyboards in accordance with the commands and to output resultant information for display in common by video and/or audio display means.

The remote keyboards, which may be connected to the central computer by cable, infra-red, ultra-sonic or any other suitable data link, serve to transmit data to the central computer, a resident programme therein processing and combining the various inputs of data, to produce information for display in common. Data thus flows from each operator, via the keyboards and data link to the central computer from whence processed information is passed to the display means; data returns to the operators visually or aurally. The data link is essentially one-way.

The remote chord keyboards are essentially touch-type keyboards; preferably of the kind described in U.S. Pat. No. 4,360,892 wherein a single key or a chord of a combination of between two and five keys is operated to generate a given alphabetic, numeric or punctuation character or command. Chord keyboards have the advantages of simplicity of construction and use and a 'touch-type' facility that uniquely enables the keyboard to be used as an alpha-numeric character input device for video games or generally as a computer input device. By touch-typing a player or user is enabled to watch a display and simultaneously input character data and commands at a fast rate so that, for example, word-based games can be played "against the clock" or competitively with other players at high input speeds. Specific keys may also be designated to give movement instructions; e.g. up, down, left and right instructions for a cursor or the like.

Computer apparatus in accordance with the invention includes home micro-computers or video game devices both using a domestic television receiver as the video and audio display means.

In a preferred application of the invention up to four of the remote keyboards can be connected to a home or micro-computer whereby, according to the programme loaded into the computer, a number of different operators can operate the computer in independent or interactive modes. By this means games, such as word games, can be played with several players. For classroom use, teaching programmes may be employed wherein several students can simultaneously operate the computer.

In an embodiment of the invention each keyboard is arranged to produce discrete analog voltage signals uniquely corresponding to each operated key or keys-combination and analog-to-digital converter means are connected between the input port and the central computer. Such an arrangement is not susceptible to radio interference as are more conventional digital remote key pads.

In another embodiment of the invention, the remote chord keyboard comprises a restricted number of key-operated switches connected to switch passive electrical components arranged in a network wherein interconnections of switches and components and the individual values of the components are such that operation of any individual switch or operation of each possible combination of between two and all the switches produces a unique variance in a given parameter of the network; whereby discrete analog signals uniquely corresponding to each operated key or keys combination can be produced.

Preferably the key-operated switches are connected to a ladder network of resistors arranged so that each switch operates to switch a different parallel resistor of the network, the value of the resistors being such that the network has a different resistance for each operated key or keys combination.

The above and other features of the invention are illustrated by way of example in the drawings, wherein.

Figure 1:
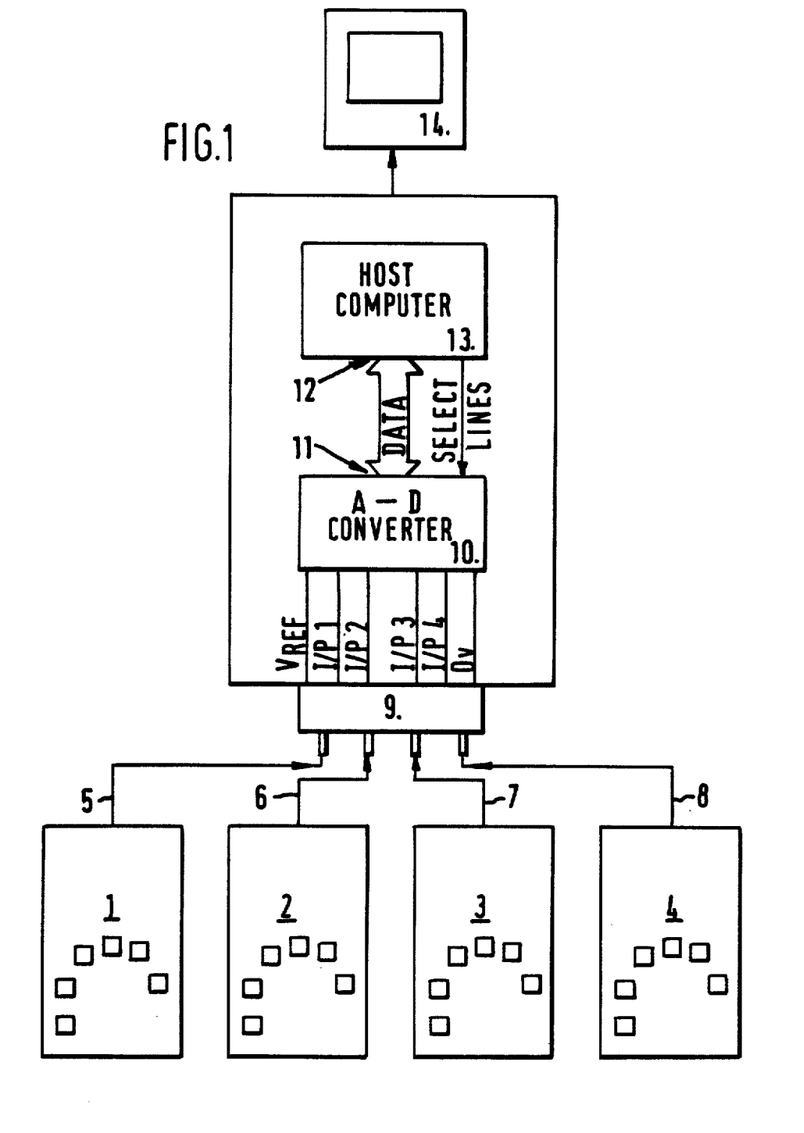
FIG. 1 is a block diagram of computer apparatus in accordance with the invention.

As shown by FIG. 1 one, computer apparatus embodying the principles of the present invention comprises four identical, six key, chord keyboards 1,2,3 and 4 each respectively connected by lines 5,6,7 and 8 to an analog input port 9 for a four channel analog-to-digital converter 10. A bidirectional data port 11 connects the A-D converter to a similar port 12 for a central or host computer 13, the output of which is connected to a video and audio display means 14.

In an example, the central computer 13 was a BBC (Trade Mark) model B micro-computer connected to a domestic television receiver, forming the video and audio display means 14; the BBC micro-computer having an inbuilt four channel A-D converter.

By these means up to five operators, one using the computer's own keyboard, can be accommodated at the same time. The computer can be used in two modes, an interactive one wherein each operator interacts with the other operators to contribute to the same programme e.g. multiplayer games or an independent one wherein each operator separately inputs character data and commands e.g. in teaching aids whereby effective use of a single micro-computer can be extended to from one to say, five students, each programming and operating the computer independently and receiving data from an assigned portion of the display.

Figure 2:
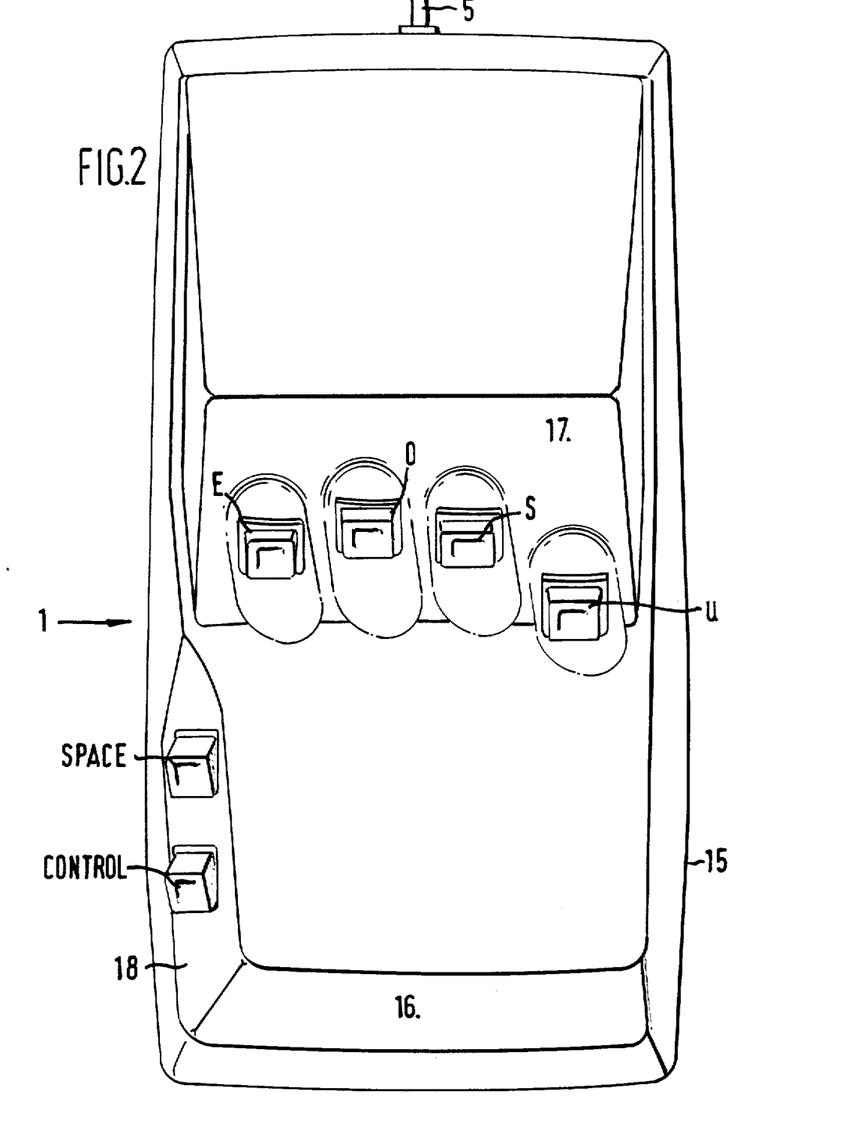
FIG. 2 is a more detailed plan of one of the remote keyboards for the apparatus of FIG. 1.

FIG. 2 shows, in more detail, one remote keyboard 1, it is conveniently, part of the portable word processor described in U.S. Pat. No. 4,360,892 and it consists of a casing 15 generally in the form of a truncated square pyramid having an essentially planar rear face 16 and four keys E, O, S and U carried by the opposite front face 17; the keys are intended to be operated by the index, middle ring and little fingers of an operator's right hand. A side face 18, to the left of the casing, carries two further keys SPACE and CONTROL; each intended to be used by an operator's thumb. Output lead 5 terminated by a suitable plug forms the data link to the input port 9. The key references are the character or command generated by operation of that key alone. Other characters or commands are generated by operation of chords of keys e.g. SPACE+O+S generates the character 'Y' or '?' (if shifted to the numerals and punctuation register) and CONTROL+O+S generates the command 'Shift to numerals and punctuation register'; similarly, SPACE+E generates '1' or '2' and CONTROL+E generates the command 'INSERT'.

Figure 3:
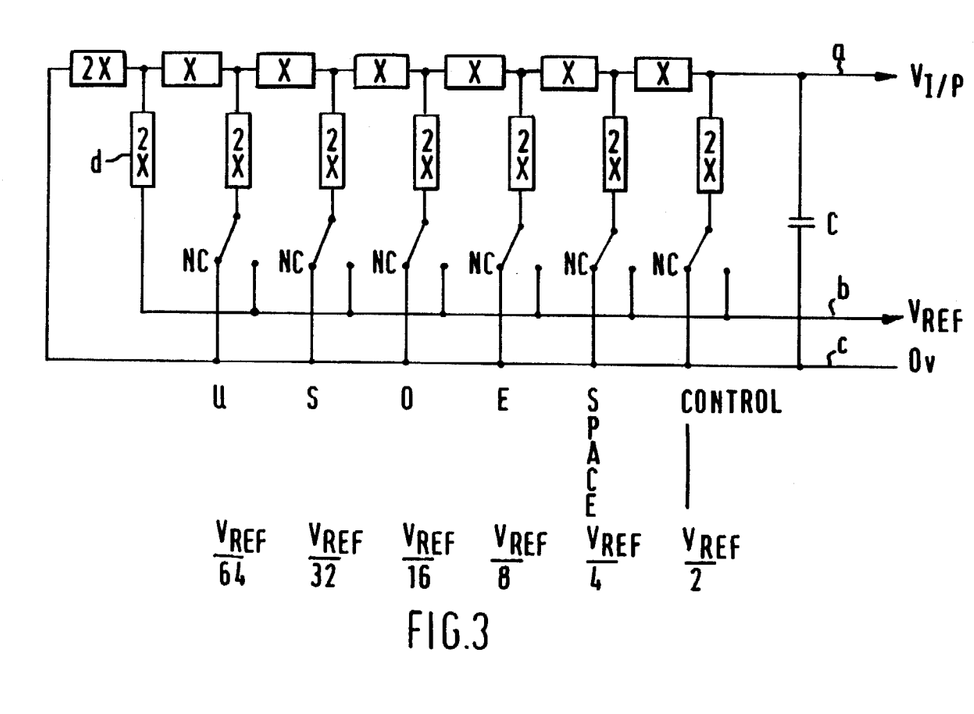
FIG. 3 is a circuit diagram for a resistor ladder network for the keyboard of FIG. 2.

A suitable circuit for the remote keyboards is shown in FIG. 3 and consists of an "R-2R" resistor network wherein six resistors (all of value X Ohms) are serially connected to one line a of the network. Six resistors (all of value 2X Ohms) are each connected in parallel between line a and the movable contact of one of six switches CONTROL, SPACE, E, O, S and U. Each switch is a micro-switch of the normally closed type, the NC contacts of all the switches being connected to a second line b of the network whilst the other contacts of each switch are connected to a third line c of the network. Instead of a switch, a solid state device such as a CMOS gate (that is a gate having a low output resistance in comparison with the 2X Ohm resistors) could be used. A further resistor of value 2X Ohms is connected between the end of the serial resistors on line a and line c. Line b is held at one voltage Vref and line c at another voltage, in this case common i.e. Ov; the output signal I/P is present on line a.

The operation of the network is such that operation of each of the six switches CONTROL, SPACE, E, O, S and U, from its normally closed position, produces an output signal Vref between lines a and c that is binarily weighted for the position of that switch in the network. The output signal for individual operation of each switch can be tabled as below:

| Switch operated | Output signal | Binary weighting |
| --- | --- | --- |
| None | 0 | 000000 |
| CONTROL | Vref ½ | 100000 |
| SPACE | Vref ¼ | 010000 |
| E | Vref ⅛ | 001000 |
| O | Vref 1/16 | 000100 |
| S | Vref 1/32 | 000010 |
| U (least significant digit) | Vref 1/64 | 000001 |

Clearly, operation of each possible combination of switches will produce a unique output signal, for example operation of keys SPACE, O, S and U produce the output signal (23/64) Vref (010111); which can generate the letter 'M' or the numeral '8'.

In a preferred form, a further resistor d, of value 2X Ohms, is connected at the end of the serial X ohm and 2X ohm resistors R between lines a and b. The effect of resistor d is to ensure that an offset voltage equal to one half L.S.D. (L.S.D. being the least significant digit, i.e. in this example switch U) is added to all voltages thus easing decoding of the signals produced by the keyboard. Each code spans its fraction of the reference voltage from V−Vref/128 to V+Vref/128, where V is the nominal value. With resistor d in circuit, the output signal for individual operation of each switch is as previously, but with the addition of one half L.S.D. Thus, operation of keys SPACE, O, S and U produce the output signal ratio (5+3+2+1+½)=11½.

Conveniently, the code first described in U.S. Pat. No. 4,360,892 can be used in the assignment of particular characters and commands to particular combinations of switch operations; of course other codes could be used.

Capacitor C is connected between line a and line c to suppress superfluous waveforms, such as switching spikes, in the output.

Although a six switch network has been described, other networks with less or more switches could be employed although the accuracy and availability of resistors will provide a practical upper limit to the number of switches of about eight.

In the described example, each of the data links 5, 6, 7 and 8 have three conductors for the three lines a, b and c to connect the respective keyboard to the central computer.

As already mentioned, the BBC model B microcomputer can accept analog signals as input data and can provide a suitable reference voltage (Vref).

Returning to FIG. 1, the A-D converter 10 translates an input voltage (input 1, input 2, input 3 or input 4) into 8 bit data for processing by the host computer. As described above the input voltage is directly related to the pattern or chord of keys pressed. The 8 bit bidirectional port 11 receives instructions from the host computer 13, selects the channel number and starts the A to D conversion. When the conversion is complete, port 11 sets a bit to indicate to the computer 13 that data is available for collection. The host computer may then sample regularly (e.g. every 10 milliseconds) or only collect data when conversion is complete. Repeated scanning of all four channels via the single 8 bit port, enables data to be collected and the processing of this data allows the current status of any keyboard to be ascertained. With a six switch network as described above only 6 bits are required and the software of the resident programme is arranged to discount the unwanted 2 bits from the A-D converter. Data is identified with a particular input by virtue of the resident programme controlling the CPU to scan the input channels to the A-D converter and causes the CPU to pre-assign memory locations. When a key is operated on any one keyboard the programme causes the CPU to remember that key and all subsequent keys which are operated on that keyboard until all the operated keys are released. The stored key operations are then interpreted by the programme according to the current state, i.e. SHIFT, set in the programme to cause the CPU to either alter the state of the programme as the result of a command or to generate an output character, or both.

Figure 4:
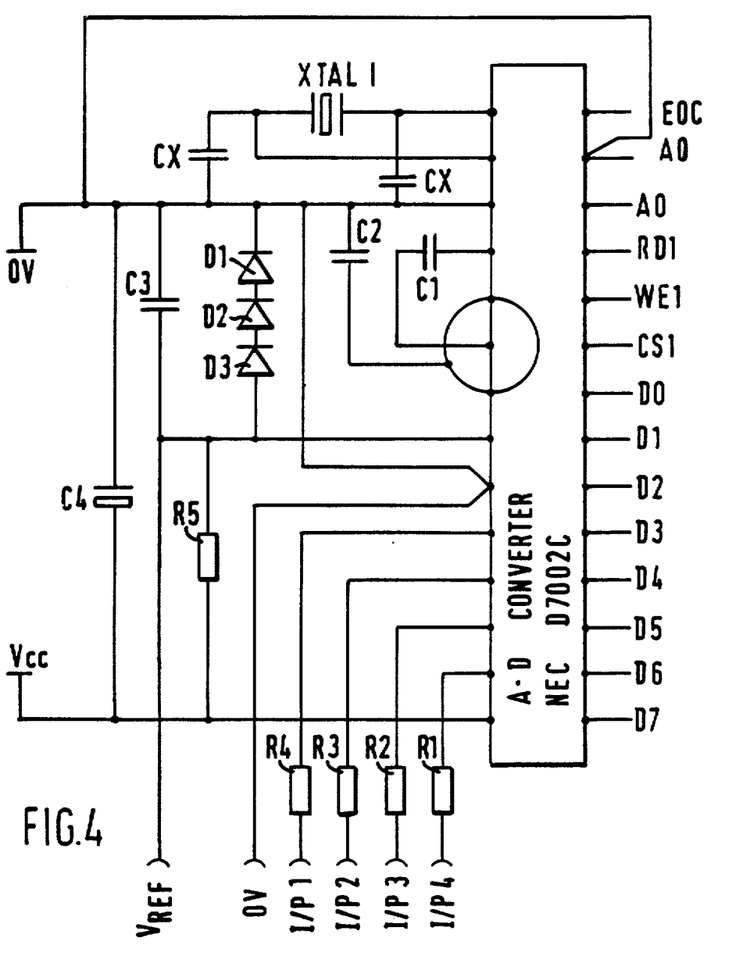
FIG. 4 is a circuit diagram of an A-D converter interface.
Figure 5:
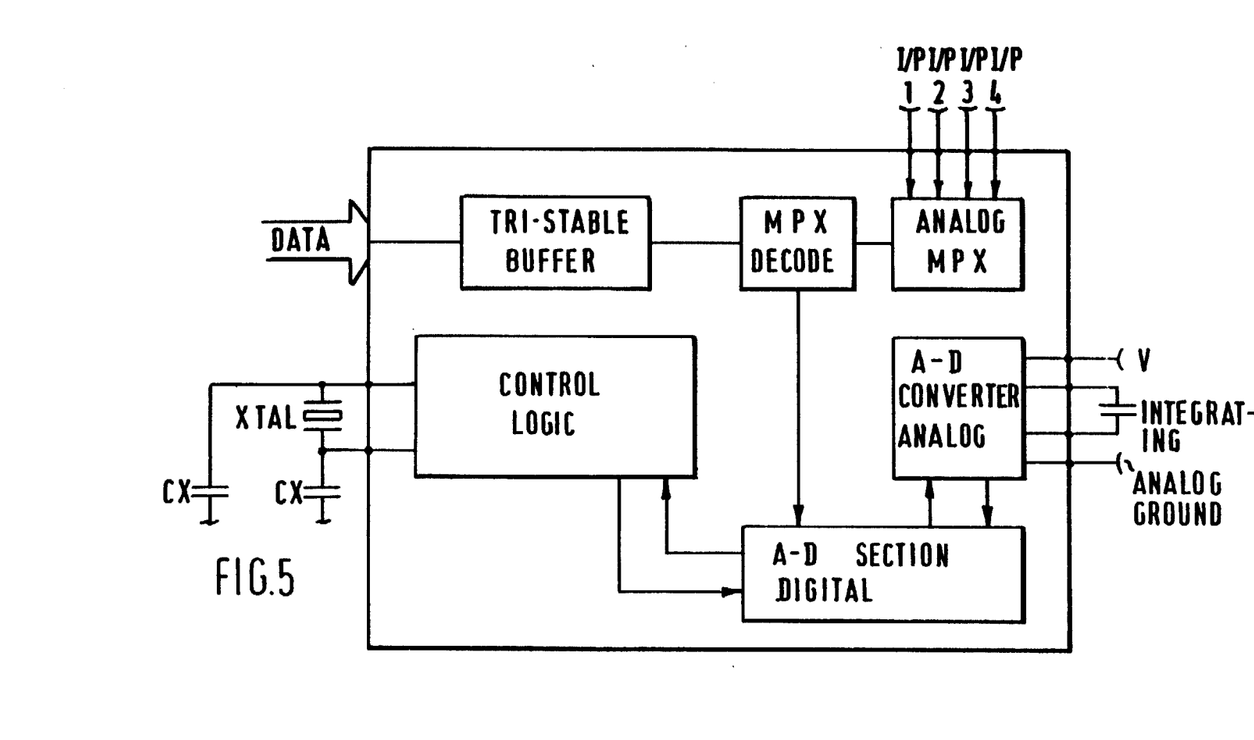
FIG. 5 is a block diagram of the converter of FIG. 4.

FIG. 4 shows a circuit for an interface for use with micro-computers that do not have an analog input port, such as a Commodore VIC 64 Home Computer; the interface is based on an NEC D7002C A/D converter of which a block diagram is shown in FIG. 5.

The operation of the circuit is as follows:

Capacitor C1 provides the integration for the internal conversion process of the integrated circuit.

Capacitor C2 reduces noise and instability on the converter by ac decoupling a guard ring on the printed circuit board.

Crystal XTAL1 with its associated capacitors generate a 2.45 MHz clock, to which the internal IC circuit is locked.

Diodes D1, D2 and D3 together with R5 and C3 provide a reference voltage of approximately 1.5 V. The stability of the reference is not critical as the voltage returned to the analog input is internally compared with a reference voltage and the result of the comparison is a digital number expressing the input as a proportion of the reference voltage i.e. Vref=255 (hex FF) OV=0.

Capacitor C4 removes transient noise from the power supply.

Line resistors R1, R2, R3 and R4 are purely protection devices to prevent high energy pulses damaging the input circuitry of the IC.

The input of the IC must be high impedance, greater than 10M ohm so that its effect on the keyboard effective resistance and series protection resistor is negligible.

The interface to the controlling device is via signals D0 through D7 (the data bus) and the selection signals WE1, RD1, CS1, A0, & A1.

Only the relevant states used in this application are described. Other states such as 10 bit conversion have been suppressed.

Computer apparatus in accordance with the invention thus enables complex alphabetic, character, or word-based games to be played with the same facility that joy-stick controlled video games are currently played. However, games being developed for use with the invention not only assist in training hand-eye coordination (as do current games of the "Space Invaders"—trade mark type) but can and very preferably do have a high level of mentation. Players will have to think and construct quickly in words and numerals as well as being able to react quickly.

In teaching applications, the practical usage of a single micro-computer, of which many already exist in schools and colleges, can be extended four or five-fold. Additionally, the "game" facility can be used to teach computer usage to children whilst capturing their attention and enthusiasm. Given a central computer of sufficient speed and capacity, a large enough video display, and a suitable A-D converter (i.e. faster and of high input impedance) there is no reason why a whole class room, of say 32 pupils, should not be simultaneously linked to the computer; each with a respective remote chord keyboard.

Given below is a listing of resident programme for a BBC Model B micro-computer. Following the listing is an explanation of the programme structure together with a listing of the "standard set" of character and command codes.

```
FILE X.GENOGEN PAGE 1(c) Microwriter '84 listed 9.2.84

220DEFPROCassembler(opt%,gap%):start=gap%
230REM copyright Microwriter Ltd. 1984, prepared J.P.Southgate
240REM machine code resident routine for 4 Microwriter keyboards
250REM on BBC computer with o's 1.2 or upwards & disc drive
260
262REM table begins at PAGE-256
265REM register mode selected by table+&C0
266REM if zero then STANDARD registers
267REM otherwise ALTERNATIVE registers
268REM repeat selected by table+&80
269REM repeat enabled unless contents are zero
270REM output mode selected by table+0
275REM if zero then output via indirection bytes
280REM otherwise output to buffer
290REM output character in PAGE-260 to PAGE-257
300REM shifts are held in PAGE-264 to PAGE-261
310sH=&01:REM bit &01=1 is H-shift
320sX=&04:REM bit &04=1 is extension shift
330sY=&08:REM bit &08=1 is punctuation shift
340lY=&10:REM bit &10=1 is punctuation lock
350lU=&20:REM bit &20=1 is uppercase lock bit
360sU=&80:REM bit &80=1 is uppercase shift
370
380EVNTV=&220:OSBYTE=&FFF4:locA%=&404:IRQ2V=&206:UINTFLG=&FE4D:ADCREG=&FEC0
390P%=gap%
400
410[OPT opt%
420EQUD &3105000D:EQUW &22F1:\line5, PRINT"
430EQUS "GENO/(c)Microwriter 83"\title
440EQUD &3A221520:EQUD &2B9020D6:\screen off, ";CALL PAGE+
450EQUD &3A343326:EQUD &2B903DD0\&34;PAGE=PAGE+
460EQUD &30303326:EQUD &FF0DE03A\&300;END, end of BASIC
470.setup SEI:LDA &206:STA ret_ad+1:LDA &207:STA ret_ad+2\chaining save
480LDA #int MOD 256:STA &206:LDA #int DIV 256:STA &207:CLI
490LDA #233:LDX #239:LDY #0:JSR OSBYTE\disable ADC event - link thro' IRQ2V
500LDA #180:LDX #(prog_end+255)DIV256:LDY #0:JSR OSBYTE
510LDA #138:LDX #0:LDY #249:JSR OSBYTE\enter RUN,CR to buffer
520LDA #138:LDX #0:LDY #6:JSR OSBYTE
530LDA #138:LDX #0:LDY #13:JSR OSBYTE:RTS
```

```
540.int LDA &FC:PHA:TXA:PHA:TYA:PHA:PHP
550LDA UINTFLG:AND #&10:CMP #&10:BNE out1:STA UINTFLG
560LDA ADCREG:AND #3:TAY:INY
570LDX ADCREG+1:TYA:STA ADCREG
580TXA:LSR A:LSR A:TAX:BEQ relse\keys released?
590LDA cntr-1,Y:BNE rpting:CPX #&3F:BNE norpt:LDA table+&80:BEQ norpt
600LDA #0:STA carcass-1,Y:LDA #1:STA cntr-1,Y:.out1 JMP out
610.rpting LDA cntr-1,Y:SEC:SBC #1:STA cntr-1,Y:BNE out1
620TYA:PHA:LDA #197:LDX #0:LDY #255:JSR OSBYTE:PLA:TAY:TXA:LSR A
630STA cntr-1,Y:JMP tobuf
640.norpt TXA:CMP carcass-1,Y:BCC out1:STA carcass-1,Y:JMP out
650.relse STA cntr-1,Y:LDA carcass-1,Y:BEQ out1\keys not yet pressed?
660TAX:LDA #0:STA carcass-1,Y
670LDA shift-1,Y:AND #(sX+sH):BNE HXshft
680.nHXshft LDA shift-1,Y:AND #(1Y+sU):CMP #1Y:BNE nYlock
690LDA table+128,X:CMP #&7E:BCC Yshft
700.nYlock LDA shift-1,Y:AND #sY:BNE Yshft
710LDA table,X:CMP #ASC"a":BCC nlock:CMP #(ASC"z"+1):BCS nlock
720LDA shift-1,Y:AND #1U:BEQ nlock
730LDA shift-1,Y:EOR #sU:STA shift-1,Y
740.nlock LDA shift-1,Y:AND #sU:BEQ lcase
750TXA:CLC:ADC #64:TAX:JMP lcase\uppercase shift applied
760.HXshft CPX #32:BCS lthmb:AND #4:BNE Xshft
770TXA:CLC:ADC #(192+32):TAX:JMP lcase\H shift applied
775.lthmb LDA table+&C0:BEQ nHXshft
780.Xshft TXA:CLC:ADC #192:TAX:JMP lcase\extension shift applied
790.Yshft TXA:CLC:ADC #128:TAX\punctuation shift applied
800.lcase LDA shift-1,Y:AND #(1U+1Y):STA shift-1,Y\clear shifts
810LDA table,X:TAX:CPX #&F0:BCS shift_set:STA oldchr-1,Y
820.tobuf LDA chrout-1,Y:BNE nready:LDA oldchr-1,Y:STA chrout-1,Y
821LDA chrout-1,Y:BNE nready:LDA oldchr-1,Y:STA chrout-1,Y
824.nready LDA table:BEQ out:LDA oldchr-1,Y
840.escap TAY:LDA #153:LDX #0:JSR OSBYTE:JMP out
850.shift_set
860LDA shift-1,Y:ORA #sX:CPX #&FF:BEQ shift_done\X shift
870LDA shift-1,Y:ORA #sY:CPX #&FE:BEQ shift_done\Y shift
880LDA shift-1,Y:ORA #sU:CPX #&FD:BEQ shift_done\uc shift
890LDA #1U:CPX #&FC:BEQ shift_done\uc lock
900LDA #0:CPX #&FB:BEQ shift_done\unlock
910LDA shift-1,Y:ORA #sH:CPX #&F9:BEQ shift_done\H shift
920LDA #1Y:CPX #&F8:BEQ shift_done\Y lock
930LDA shift-1,Y\no generated response &FA
940.shift_done STA shift-1,Y:JMP out
950.out PLP:PLA:TAY:PLA:TAX:PLA:STA &FC:.ret_ad JMP &DE89
960]:P%=((P%+&13) AND &FF00)+&EC:[OPT opt%
970.oldchr EQUD 0:.carcass EQUD 0:.cntr EQUD 0
980.shift EQUD 0:.chrout EQUD 0:.table
990EQUS " usgoqnbevt,a-.m hkjczyxilrwd'fp"\lower case
1000EQUS "cgl4M3ba0 I    2 e                "\lower case control (patched)
1010EQUS " USGOQNBEVT A  M HKJCZYXILRWD FP"\upper case
1020EQUS "d                                "\upper case control (patched)
1030EQUS " 6$70)""81&+,*!.9 -/=(%?X2£/;3@45"\punctuation
1040EQUS "    h                            "\punctuation control
1050EQUS "@USGOQNBEVT)A~\M HKJCZYXILRWD_FP"\X shift (will subtract &41)
1060EQUS " 6 70  81\`  ) 9 _ >( |{2< #3 45"\H shift
1070.prog_end:]:P%=((P%-1) AND &FF00)+&104:P%!-4=&0000FF0D
1080
1090REM support for control codes (some other codes not to buffer)
1100FOR N=0 TO &BF:IF (N AND 32)=0 OR table?N=32 THEN GOTO 1130
1110IF table?N>=ASC"a" AND table?N<=ASC"z" table?N=&FF-table?N+ASC"a":GOTO 1130
1120IF table?N>&2F AND table?N<&3A table?N=table?N+91 ELSE table?N=table?N-&40
1130NEXT:table?&2C=&7F:table?59=27:REM delete, escape
1140REM support for f0-f9 in H shift
1150FOR N=&E0 TO &FF:IF table?N>&2F AND table?N<&3A THEN table?N=table?N+&50
1160NEXT
1170REM support for BBC control-shifted codes
1180FOR N=&C0 TO &DF:table?N=table?N-&40:NEXT
1190FOR N=0 TO 255:IF table?N=32 THEN table?N=&FA
1200NEXT:table?16=32:REM space
1210table?0=&FF:table?&80=&FF:table?&C0=0:REM mode control bytes
1220ENDPROC
```

PROGRAMME STRUCTURE

GENn is a machine-code programme which is supplied embedded in a relocating loader. Both the loader and GENn are designed to be CHAINed in BASIC.

The structure supplied is as follows:

(a) BASIC part of relocating loader
(b) machine-code part of relocating loader
(c) GENn BASIC linker
(d) GENn 'setup' machine-code link routine
(e) GENn interrupt service routine (f) GENn workspace & table area
(g) Dummy empty BASIC programme
Taking these sections in turn—
(a) & (b) (Offset 0-&2FF) These sections first modify the GENn file to amend jump references etc. to suit the current PAGE value, then copy the memory contents above Offset &2FF downwards by &300 to overwrite the loader and hence release the space it occupied. The highest address relocated is specified in Offset &1FE (low byte) and Offset &1FF (high byte) and should be amended if a BASIC programme is to be merged above GENn to form a relocatable programme. The loader terminates by placing RUN<return> into the input buffer, transferring control to the relocated GENn.
(c) (Offset &300-&334) (Relocated offsets 0-&34) This BASIC programme adds &300 to PAGE and calls section (d). The presence of this section allows BREAK, OLD, RUN to work.
(d) (Offset &335-&390 approx) This section links the A/D convertor interrupt in IRQ2V to section (e), amends OSHWM using the appropriate OSBYTE call and exits placing RUN<return> into the input buffer.
(e) (Offset &391-&4F0 approx) This section carries out QUINKEY keyboard support as detailed elsewhere.
(f) (Offset &4F0-&5FF; relocated offset &1F0-&2FF) The table entries control the operation of the handler. The table structure is defined elsewhere.
(g) (Relocated offset &300-&303) This dummy programme is RUN after GENn is CHAINED. It may be replaced by an application programme in BASIC if desired (see section b) for merging information.

It will be seen that although GENn is &603 bytes long when loaded, at run-time this is reduced to &300 (768) bytes.

The table is divided into four equal sections, which will now be discussed in turn—

Section 1-PAGE-256+[00xx xxxx](binary)

| If xx xxxx=00 | 0000 this is the output mode select flag if not zero then output to keyboard buffer if zero then seperated output (see below) |
|---|---|

Otherwise xx xxxx is key code (lsb='u' key) and contents are data generated by that code (codes greater than &F7 have special meanings and do not directly result in output)

IF xx xxxx=11 1111 then the last character will repeat (if this function is enabled, see below)

Section 2-PAGE-256+[01xx xxxx](binary)

If xx xxxx=00 0000 this location is not used

Otherwise xx xxxx is key code (lsb='u' key) and contents are data generated by that code in upper case (codes greater than &F7 have special meanings and do not directly result in output). Note that if the entry in Section 1 for the code is from 'a' to 'z' inclusive and uppercase lock is engaged the Section 2 code will be used, so long as uppercase shift has not been engaged. Otherwise Section 2 is selected by uppercase shift only.

IF xx xxxx=11 1111 then the last character will repeat (if this function is enabled, see below)

Section 3-PAGE-256+[10xx xxxx](binary)

| If xx xxxx=00 | 0000 this is the repeat enable flag if not zero then repeat enabled if zero then no repeat the repeat rate is selected by *FX197 |
|---|---|

Otherwise xx xxxx is key code (lsb='u' key) and contents are data generated by that code if Y-shift is engaged (codes greater than &F7 have special meanings and do not directly result in output). Note that if this code is less than &7F this code will be returned when Y-lock is engaged, otherwise the state of Y-lock is ignored.

If xx xxxx=11 1111 then the last character will repeat (if this function is enabled, see below)

Section 4-PAGE-256+[11xx xxxx](binary)

| If xx xxxx=00 | 0000 this is the register mode select flag if not zero then ALTERNATIVE MODE if zero then STANDARD MODE |
|---|---|

STANDARD MODE 0x xxxx is key code (lsb='u' key) and contents are data generated by that code if X-shift is engaged (codes greater than &F7 have special meanings and do not directly result in output)

1x xxxx is key code (lsb='u' key) and contents are data generated by that code if H-shift is engaged (codes greater than &F7 have special meanings and do not directly result in output)

In STANDARD MODE if the lower thumb key is pressed then X-shift and H-shift states will be ignored.

IF xx xxxx=11 1111 then the last character will repeat (if this function is enabled, see below)

ALTERNATIVE MODE xx xxxx is key code (lsb='u' key) and contents are data generated by that code if X-shift is engaged (codes greater than &F7 have special meanings and do not directly result in output)

IF xx xxxx=11 1111 then the last character will repeat (if this function is enabled, see below)

Special Codes Found in the Table

| &FF | Select X-shift (for next character only) |
|---|---|
| &FE | Select Y-shift (for next character only) |
| &FD | Select uppercase shift (for next character only) |
| &FC | Engage uppercase-lock & disengage Y-lock |
| &FB | Disengage uppercase-lock & Y-lock |
| &FA | null, ignored |
| &F9 | Select H-shift (for next character only) |
| &F8 | Engage Y-lock & disengage uppercase lock |

Code &F9 should only be used when STANDARD MODE is selected.

Useful Locations Outside the Table Area
N=keyboard number (1-4)

When output to buffer is disabled, PAGE-261+N contain for each of the four keyboards the character generated by that keyboard. This location should be cleared to 00 when a character has been read, acting as a 'handshake'.

The shift & lock states of each keyboard are stored in PAGE-265+N as follows (asserted=1):

| bit &80 | uppercase shift |
|---|---|
| bit &40 | uppercase lock |
| bit &10 | Y-lock |
| bit &08 | Y-shift |
| bit &04 | X-shift |
| bit &01 | H-shift |

No other locations should be altered.

The autorepeat rate may be altered using *FX197, as for QWERTY autorepeat. Note that the QUINKEY rate is not precisely identical to the corresponding QWERTY rate. There is no autorepeat delay on QUINKEY.

While the QUINKEY is in operation the A/D convertor is monopolised, and ADVAL(1)-ADVAL(4) have no meaning. To turn off QUINKEY use *FX223,16,239, and after 40 mS the ADVAL values will be meaningful. QUINKEY may be restored by *FX233,0,239 when required, provided *FX16,0 is not then in effect.

| | 'STANDARD SET' CODES - as supplied | | | | | | | | |
|---|---|---|---|---|---|---|---|---|---|
| | ALPHA | | U/CASE | | Y-SHIFT | | X-SHIFT | | H-SHIFT |
| keys | char | hex | char | hex | char | hex | char | hex | char | hex |
| 00 0001 | u | 75 | U | 55# | 6 | 36@ | NAK | 15 | f6 | 86 |
| 00 0010 | s | 73 | S | 53# | $ | 24@ | DC3 | 13 | | FA* |
| 00 0011 | g | 67 | G | 47# | 7 | 37@ | BEL | 07 | f7 | 87 |
| 00 0100 | o | 6F | O | 4F# | 0 | 30@ | SI | 0F | f0 | 80 |
| 00 0101 | q | 71 | Q | 51# | ) | 29@ | DC1 | 11 | | FA* |
| 00 0110 | n | 6E | N | 4E# | " | 22@ | SO | 0E | | FA* |
| 00 0111 | b | 62 | B | 42# | 8 | 38@ | STX | 02 | f8 | 88 |
| 00 1000 | e | 65 | E | 45# | 1 | 31@ | ACK | 05 | f1 | 81 |
| 00 1001 | v | 76 | V | 56# | & | 26@ | SYN | 16 | \ | 5C |
| 00 1010 | t | 74 | T | 54# | + | 2B@ | DC4 | 14 | | 7E |
| 00 1011 | , | 2C | | FA* | , | 2C@ | GS | 1D | | FA* |
| 00 1100 | a | 61 | A | 41# | * | 2A@ | SOH | 01 | | FA* |
| 00 1101 | — | 2D | | FA* | ! | 21@ | RS | 1E | } | 7D |
| 00 1110 | . | 2E | | FA* | . | 2E@ | FS | 1C | | FA* |
| 00 1111 | m | 6D | M | 4D# | 9 | 39@ | CR | 0D | f9 | 89 |
| 01 0000 | sp | 20 | | FA* | | FA* | NUL | 00 | | FA* |
| 01 0001 | h | 68 | H | 48# | — | 2D@ | BS | 08 | — | 5F |
| 01 0010 | k | 6B | H | 4B# | / | 2F@ | VT | 0B | | FA* |
| 01 0011 | j | 6A | J | 4A# | = | 3D@ | LF | 0A | > | 3E |
| 01 0100 | c | 63 | C | 43# | ( | 28@ | ETX | 03 | [ | 5B |
| 01 0101 | z | 7A | Z | 5A# | % | 25@ | SUB | 1A | | FA* |
| 01 0110 | y | 79 | Y | 59# | ? | 3F@ | EM | 19 | { | 7B |
| 01 0111 | x | 78 | X | 58# | X | 58@ | CAN | 18 | | | 7C |
| 01 1000 | i | 69 | I | 49# | 2 | 32@ | HT | 09 | f2 | 82 |
| 01 1001 | l | 6C | L | 4C# | Σ | 60@ | FF | 0C | < | 3C |
| 01 1010 | r | 72 | R | 52# | ; | 3B@ | DC2 | 12 | | FA* |
| 01 1011 | w | 77 | W | 57# | : | 3A@ | ETB | 17 | # | 23 |
| 01 1100 | d | 64 | D | 44# | 3 | 33@ | EOT | 04 | f3 | 83 |
| 01 1101 | ' | 27 | | FA* | @ | 40@ | US | 1F | | FA* |
| 01 1110 | f | 66 | F | 46# | 4 | 34@ | ACK | 06 | f4 | 84 |
| 01 1111 | p | 70 | P | 50# | 5 | 35@ | DLE | 10 | f5 | 85 |
| 10 0000 | uc shift | FD* | uc lock | FC* | | FA* | | | | |
| 10 0001 | H-shift | F9* | | FA* | | FA* | | | | |
| 10 0010 | left | 8C | | FA* | | FA* | | | | |
| 10 0011 | up | 8F | | FA* | | FA* | | | | |
| 10 0100 | return | 0D | | FA* | | FA* | | | | |
| 10 0101 | down | 8E | | FA* | | FA* | | | | |
| 10 0110 | Y-shift | FE* | | FA* | Y-lock | F8* | | | | |
| 10 0111 | X-shift | FF* | | FA* | | FA* | | | | |
| 10 1000 | copy | 8B | | FA* | | FA* | | | | |
| 10 1001 | | FA* | | FA* | | FA* | | | | |
| 10 1010 | tab | 09 | | FA* | | FA* | | | | |
| 10 1011 | | FA* | | FA* | | FA* | | | | |
| 10 1100 | delete | 7F | | FA* | | FA* | | | | |
| 10 1101 | | FA* | | FA* | | FA* | | | | |
| 10 1110 | right | 8D | | FA* | | FA* | | | | |
| 10 1111 | | FA* | | FA* | | FA* | | | | |
| 11 0000 | unlock | FB* | | FA* | | FA* | | | | |
| 11 0001 | | FA* | | FA* | | FA* | | | | |
| 11 0010 | | FA* | | FA* | | FA* | | | | |
| 11 0011 | | FA* | | FA* | | FA* | | | | |
| 11 0100 | | FA* | | FA* | | FA* | | | | |
| 11 0101 | | FA* | | FA* | | FA* | | | | |
| 11 0110 | | FA* | | FA* | | FA* | | | | |
| 11 0111 | | FA* | | FA* | | FA* | | | | |
| 11 1000 | | FA* | | FA* | | FA* | | | | |
| 11 1001 | | FA* | | FA* | | FA* | | | | |
| 11 1010 | | FA* | | FA* | | FA* | | | | |
| 11 1011 | escape | 1D | | FA* | | FA* | | | | |
| 11 1100 | | FA* | | FA* | | FA* | | | | |
| 11 1101 | | FA* | | FA* | | FA* | | | | |
| 11 1110 | | FA* | | FA* | | FA* | | | | |
| 11 1111 | repeat | | repeat | | repeat | | | | | |

*this code does not generate an output character
uc lock applies only to these codes if alpha
@Y-lock applies only to these codes if <&7F

We claim:

1. Computer apparatus comprising:

a host computer having a data input port and a central processing unit;

a plurality of remote chord keyboards, operation of each of which generates character data and command instructions;

means so connecting each of said remote chord keyboards to said data input port as to provide for a one-way transmission of data from each said keyboard to said host computer;

means connecting the central processing unit of the host computer to said data input port;

means connected to said data input port for identifying the character data and command instructions generated by each remote chord keyboard; and a single visual display unit so connected to said host computer as to be visible to each remote chord keyboard operator;

the central processing unit of the host computer comprising means for processing data generated by independent operation of each of said remote chord keyboards in accord with instructions generated by said independent operation of each of said remote chord keyboards, and said host computer further comprising means for transmitting information resulting from said processing of data to said visual display unit for display in common to said operators, the last-mentioned means and the visual display unit being the only link for transferring data from the host computer to the operators.

2. Computer apparatus comprising:

a host computer having a data input port and a central processing unit;

a plurality of remote chord keyboards, operation of each of which generates character data and command instructions;

means so connecting each of said remote chord keyboards to said data input port as to provide for a one-way transmission of data from each said keyboard to said host computer;

means connecting the central processing unit of the host computer to said data input port;

means connected to said data input port for identifying the character data and command instructions generated by each remote chord keyboard; a visual display unit connected to said host computer;

the central processing unit of the host computer comprising means for processing data generated by independent operation of each of said remote chord keyboards in accord with instructions generated by said independent operation of each of said remote chord keyboards; and means for transmitting information resulting from said processing of data to said visual display unit for display to said operators;

the means connecting said remote chord keyboards to said data input port each having three conductors, one for said reference voltage, one for said discrete analog voltage signals and one for signal ground; said computer apparatus further comprising a network which is an R-2R ladder network of resistors; and said key-operated switches being so connected to said network as to so switch parallel resistors in said network between said reference voltage conductor and said signal ground conductor that the signal on said discrete analog voltage signal conductor varies in voltage with the binary weighting of the operated switch or switch combination.

3. Computer apparatus as claimed in claim 1, wherein each said remote chord keyboard is an analog device comprising means for producing discrete analog voltage signals uniquely corresponding to each operated key or combination of operated keys and analog-to-digital converter means connected between said data input port and the central processing unit of said host computer.

4. Computer apparatus as claimed in claim 2, which includes an additional resistor connected between said reference voltage conductor and said discrete analog voltage signal conductor and in parallel with said parallel resistors and at the end of the ladder network, whereby an offset voltage equal to one half of the smallest fraction of the reference voltage made available by opening and closing said key-operated switches is added to all of said discrete analog voltage signals to thereby facilitate the decoding of the signals transmitted to said host computer from said remote chord keyboards.

5. Computer apparatus as defined in claim 1 wherein the character data and command instructions generated by each of said remote chord keyboards are in the form of discrete analog signals and wherein the computer apparatus further comprises an analog-to-digital converter operatively interposed between said remote chord keyboards and the data input port of said host computer for converting the discrete analog signals generated by said remote chord keyboards to digital signals that can be accepted by said data input port.

* * * * *

UNITED STATES PATENT AND TRADEMARK OFFICE
CERTIFICATE OF CORRECTION

PATENT NO. : 4,727,478
DATED : 23 February 1988
INVENTOR(S) : Cyril Endfield et al.

It is certified that error appears in the above—identified patent and that said Letters Patent is hereby corrected as shown below:

ON TITLE PAGE:

IN THE ABSTRACT:

Line 7, the "semicolon" has been changed to a --period--; "the" has been changed to --The--.

Line 21, "keyboard" has been changed to --keyboards--.

Column 1, line 26, "connected" has been changed to --connecting--.

Column 2, line 48, a "comma" has been inserted after --1--; the "comma" after --one-- has been removed.

Column 4, line 3, "R" has been deleted.

Signed and Sealed this

Twenty-seventh Day of August, 1991

Attest:

HARRY F. MANBECK, JR.

Attesting Officer

Commissioner of Patents and Trademarks